US012606924B2

(12) United States Patent　　Oikawa

(10) Patent No.:　US 12,606,924 B2
(45) Date of Patent:　Apr. 21, 2026

(54) ELECTROLYTIC CELL

(71) Applicant: HONDA MOTOR CO., LTD., Tokyo (JP)

(72) Inventor: Hiroshi Oikawa, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 513 days.

(21) Appl. No.: 18/173,073

(22) Filed: Feb. 23, 2023

(65) Prior Publication Data

US 2023/0295823 A1　　Sep. 21, 2023

(30) Foreign Application Priority Data

Mar. 16, 2022　(JP) ................................. 2022-041795

(51) Int. Cl.
| | |
|---|---|
| *C25B 15/08* | (2006.01) |
| *B01D 53/32* | (2006.01) |
| *C25B 1/23* | (2021.01) |
| *C25B 3/03* | (2021.01) |
| *C25B 3/26* | (2021.01) |

(52) U.S. Cl.
CPC ............ *C25B 15/08* (2013.01); *B01D 53/326* (2013.01); *C25B 1/23* (2021.01); *C25B 3/03* (2021.01); *C25B 3/26* (2021.01); *B01D 2257/504* (2013.01); *B01D 2258/01* (2013.01); *B01D 2258/06* (2013.01)

(58) Field of Classification Search
None
See application file for complete search history.

(56) References Cited

U.S. PATENT DOCUMENTS

2024/0059592 A1 * 2/2024 Uchiumi ................... C25B 9/77

FOREIGN PATENT DOCUMENTS

| | | | | |
|---|---|---|---|---|
| DE | 102015118352 A1 * | 4/2017 | ........... | C02F 1/4618 |
| WO | 2018232515 A1 | 12/2018 | | |

* cited by examiner

*Primary Examiner* — Louis J Rufo
(74) *Attorney, Agent, or Firm* — CKC & PARTNERS CO., LLC

(57) ABSTRACT

A fluid flow path has an introduction unit, an outflow unit, and contact units. The introduction unit is formed on a surface of a cathode-side primary flow path structure opposite to a cathode as an elongated recess with a width smaller than that of a tube. The tube abuts against the introduction unit so as to straddle the introduction unit. The outflow unit is formed on a surface of the cathode-side primary flow path structure opposite to the cathode as an elongated recess with a width smaller than that of the tube. The tube abuts against the outflow unit so as to straddle the outflow unit. The contact unit is formed in the groove shape on a surface of the cathode-side primary flow path structure on the cathode side. The contact unit has its upstream end connected to the introduction unit and its downstream end connected to the outflow unit.

6 Claims, 12 Drawing Sheets

FIG. 2

STACKING DIRECTION

ELECTROLYTIC CELL

This application is based on and claims the benefit of priority from Japanese Patent Application No. 2022-041795, filed on 16 Mar. 2022, the content of which is incorporated herein by reference.

BACKGROUND OF THE INVENTION

Field of the Invention

The present invention relates to an electrolytic cell that includes a cathode and an anode and decomposes carbon dioxide.

Related Art

Technologies for recovering carbon dioxide from exhaust gas or air and electrochemically reducing it to obtain valuable substances are promising technologies that can achieve carbon neutrality.

For this kind of technology of recovering carbon dioxide, a technology is known in which carbon dioxide contained in gas is physically or chemically adsorbed on a solid or liquid adsorbent and then desorbed with energy such as heat so as to be used. In addition, as the technology for electrochemically reducing carbon dioxide, there is a known technology in which a cathode has a catalyst layer formed on the side of a gas diffusion layer in contact with an electrolytic solution by using a carbon dioxide reduction catalyst, and carbon dioxide gas is supplied to the cathode from the side of the gas diffusion layer opposite to the catalyst layer, thereby electrochemically reducing the carbon dioxide (see, for example, PCT International Publication No. WO2018/232515).

Patent Document 1: PCT International Publication No. WO2018/232515

SUMMARY OF THE INVENTION

The challenge of achieving such carbon neutrality is improving economic efficiency. To improve economic efficiency, carbon dioxide losses need to be reduced by enhancing energy efficiency. Making the reduction process of carbon dioxide efficient and stable is effective in improving the energy efficiency in electrolytic cells of electrochemical reaction devices. In this regard, there was room for further improvement in terms of efficiency and stabilization in the reduction processes of prior arts.

The objective of the present invention is to provide an electrolytic cell that can efficiently and stably perform the reduction process of carbon dioxide in an electrochemical reaction.

(1) The present invention relates to an electrolytic cell (for example, an electrolytic cell 20 mentioned later) having a cathode (for example, a cathode 22 mentioned later) and an anode (for example, an anode 26 mentioned later) and configured to decompose carbon dioxide, the electrolytic cell including: a plate-shaped flow path structure (for example, a cathode-side primary flow path structure 21 and an anode-side flow path structure 121) having a fluid flow path (for example, a fluid flow path 41 mentioned later) in which a fluid comes into contact with an electrode, which is the cathode or the anode; an inflow side supply pipe (for example, a tube 81 mentioned later) connected to an upstream side of the fluid flow path and configured to supply the fluid;

and an outflow side supply pipe (for example, a tube 82 mentioned later) connected to a downstream side of the fluid flow path and configured to supply the fluid, wherein the fluid flow path has:

an introduction unit (for example, an introduction unit 42 mentioned later) formed on a surface of the flow path structure opposite to the electrode as an elongated recess with a width smaller than that of the inflow side supply pipe, the inflow side supply pipe abutting against the introduction unit so as to straddle the introduction unit;

an outflow unit (for example, an outflow unit 43 mentioned later) formed on a surface of the flow path structure opposite to the electrode as an elongated recess with a width smaller than that of the outflow side supply pipe, the outflow side supply pipe abutting against the outflow unit so as to straddle the outflow unit; and a connection unit (for example, a contact unit 44 mentioned later) formed in a groove shape on a surface of the flow path structure on the electrode side, the connection unit having an upstream end thereof connected to the introduction unit and a downstream end thereof connected to the outflow unit.

Thus, the inflow side supply pipe abuts against the introduction unit, while the outflow side supply pipe abuts against the outflow unit, thereby the connection positions of the inflow side supply pipe and the outflow side supply pipe are fixed, making it possible to stably supply and discharge the fluid. Further, after the fluid supplied from the inflow side supply pipe is diffused in the introduction unit, the fluid can uniformly flow to the plurality of connection units. Meanwhile, the fluid is dispersed in the outflow unit and thus can return through the outflow side supply pipe. As a result, uniform distribution and smooth merging of the fluid to the connection units can be achieved.

(2) In the electrolytic cell of (1), the introduction unit and the connection unit may communicate with each other such that the upstream end of the connection unit is superimposed on a downstream end of the introduction unit in a thickness direction of the flow path structure, and the outflow unit and the connection unit may communicate with each other such that the downstream end of the connection unit is superimposed on an upstream end of the outflow unit in the thickness direction of the flow path structure.

Thus, an inlet and an outlet of the connection unit can be set with high accuracy. For example, the inlet and the outlet can be fabricated in the same shape with high accuracy by cutting the flow path structure from one side while also cutting it from the opposite side.

(3) In the electrolytic cell of (2), a connection area between the introduction unit and the connection unit may be formed to straddle a side surface and a bottom surface of the recess in the introduction unit, and a connection area between the outflow unit and the connection unit may be formed to straddle a side surface and a bottom surface of the recess in the outflow unit.

Thus, since the connection areas are formed at the positions where the fluid is easily concentrated, the introduction of the fluid from the introduction unit into the connection unit and the outflow of the fluid from the connection unit to the outflow unit can be performed smoothly.

(4) In the electrolytic cell of any of (1) to (3), both the introduction unit and the outflow unit may be formed in an oblong shape.

Thus, the fluid from the introduction unit can flow out of the outflow unit through the connection unit without being stagnated at the corners.

According to the present invention, the electrolytic cell of an electrochemical reaction device that can efficiently and stably perform a reduction process of carbon dioxide can be provided.

BRIEF DESCRIPTION OF THE DRAWINGS

FIG. 2 is a cross-sectional view schematically showing a configuration of an electrolytic cell of the electrochemical reaction device of the present embodiment;

DETAILED DESCRIPTION OF THE INVENTION

Hereinafter, embodiments of the present invention will be described with reference to the accompanying drawings.

Figure 1:
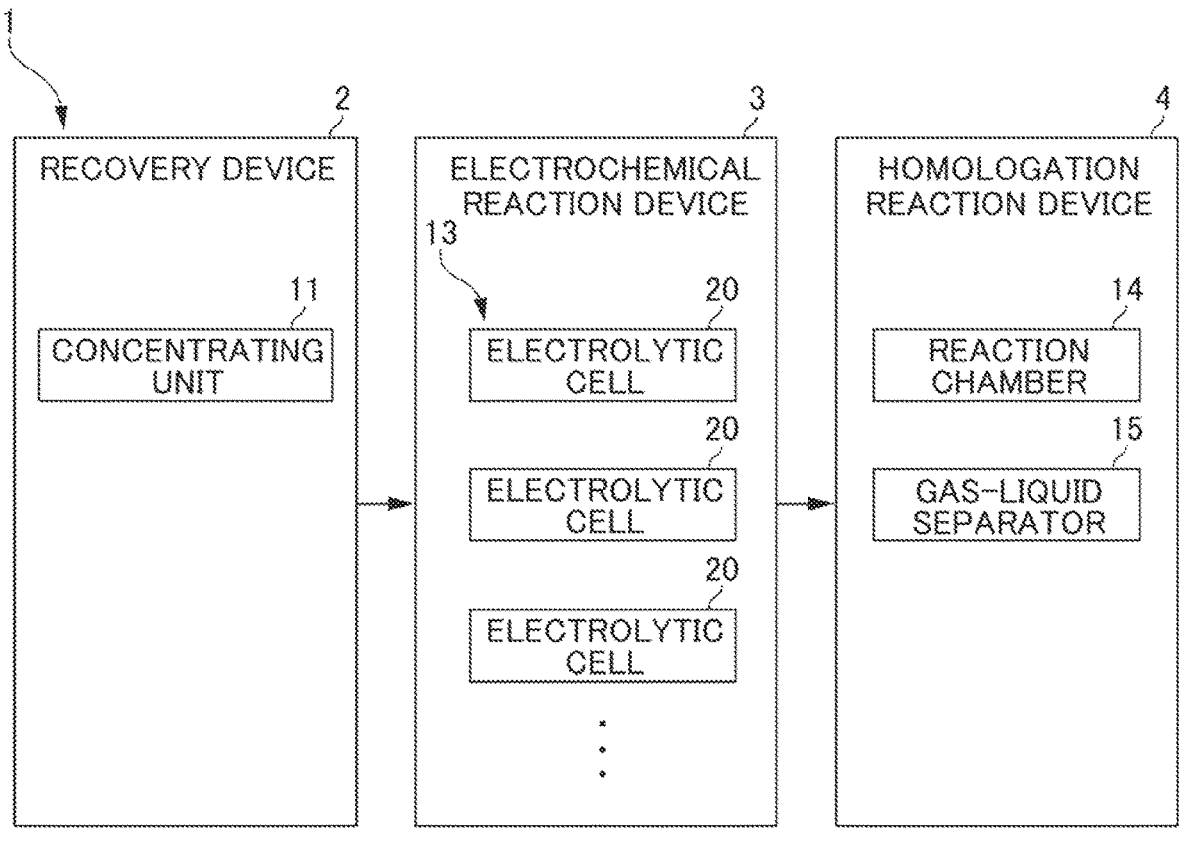
FIG. 1 is a schematic diagram showing a configuration of a carbon dioxide treatment device, including an electrochemical reaction device according to one embodiment of the present invention.

FIG. 1 is a schematic diagram showing a configuration of a carbon dioxide treatment device 1, including an electrochemical reaction device 3 according to one embodiment of the present invention. As shown in FIG. 1, the carbon dioxide treatment device 1 according to the embodiment of the present invention mainly includes a recovery device 2, the electrochemical reaction device 3, and a homologation reaction device 4.

The recovery device 2 recovers carbon dioxide from the target atmosphere, exhaust gas, etc., to be recovered, which has been supplied from the outside. The recovery device 2 includes a concentrating unit 11 that concentrates carbon dioxide to be recovered. The concentrating unit 11 is composed of, for example, a membrane separation device, an adsorption separation device using chemical or physical adsorption and desorption, or the like. Carbon dioxide gas concentrated in the concentrating unit 11 is sent to the electrochemical reaction device 3. It is noted that the recovery device 2 may have a configuration in which carbon dioxide concentrated in the concentrating unit 11 is absorbed into an electrolytic solution, and the electrolytic solution absorbing the carbon dioxide and thus containing carbonate ions is sent to the electrochemical reaction device 3. Examples of suitable electrolytic solutions include strong alkaline aqueous solutions such as a potassium hydroxide solution or a sodium hydroxide solution.

The electrochemical reaction device 3 is a device that electrochemically reduces carbon dioxide. The electrochemical reaction device 3 reduces carbon dioxide by means of an electrolytic cell stack 13, which is composed of the stacked electrolytic cells 20 that reduce carbon dioxide. The detailed configuration of the electrolytic cell 20 included in this electrolytic cell stack 13 will be mentioned later. Ethylene produced by reducing carbon dioxide in the electrolytic cell stack 13 of the electrochemical reaction device 3 is sent to the homologation reaction device 4.

The homologation reaction device 4 is a device that extends the carbon chain by multimerizing ethylene produced by carbon dioxide reduction in the electrochemical reaction device 3. The homologation reaction device 4 includes a reaction chamber 14 and a gas-liquid separator 15.

In the reaction chamber 14, a multimerization reaction of ethylene is performed in the presence of, for example, an olefin multimerization catalyst. Thus, olefins having extended carbon chains such as 1-butene, 1-hexene, and 1-octene can be formed. Examples of the olefin multimerization catalyst include a solid acid catalyst using silica alumina or zeolite as a carrier, and a transition metal complex compound.

The gas-liquid separator 15 separates a gas D that is produced after the multimerization reaction in the reaction chamber 14, into a liquid and gas. An olefin having 6 or more carbon atoms is liquid at room temperature. Therefore, when an olefin having 6 or more carbon atoms is the desired carbon compound, the temperature of the gas-liquid separator 15 is set to about 30° C., thus allowing the olefins having 6 or more carbon atoms and olefins having less than 6 carbon atoms to be easily separated into gases and liquids. In addition, if the temperature of the gas-liquid separator 15 is raised, the number of carbon atoms of the obtained olefin liquid can be increased.

Although the outline of the configuration of the carbon dioxide treatment device 1 has been described above, the configuration of the carbon dioxide treatment device 1 is not limited thereto. For example, the carbon dioxide treatment device 1 may have a configuration in which the electrolytic solution used in the electrochemical reaction device 3 is also used as an absorption solution for the absorption unit of the recovery device 2, and carbon dioxide dissolved in the electrolytic solution is supplied to the electrochemical reaction device 3, thereby electrochemically reducing the carbon dioxide. Thus, compared to a case in which carbon dioxide is adsorbed on the adsorbent and reduced by being desorbed through heating, the energy required for the desorption of carbon dioxide can be reduced, resulting in an enhanced energy efficiency as well as a reduced loss of carbon dioxide.

Figure 2:
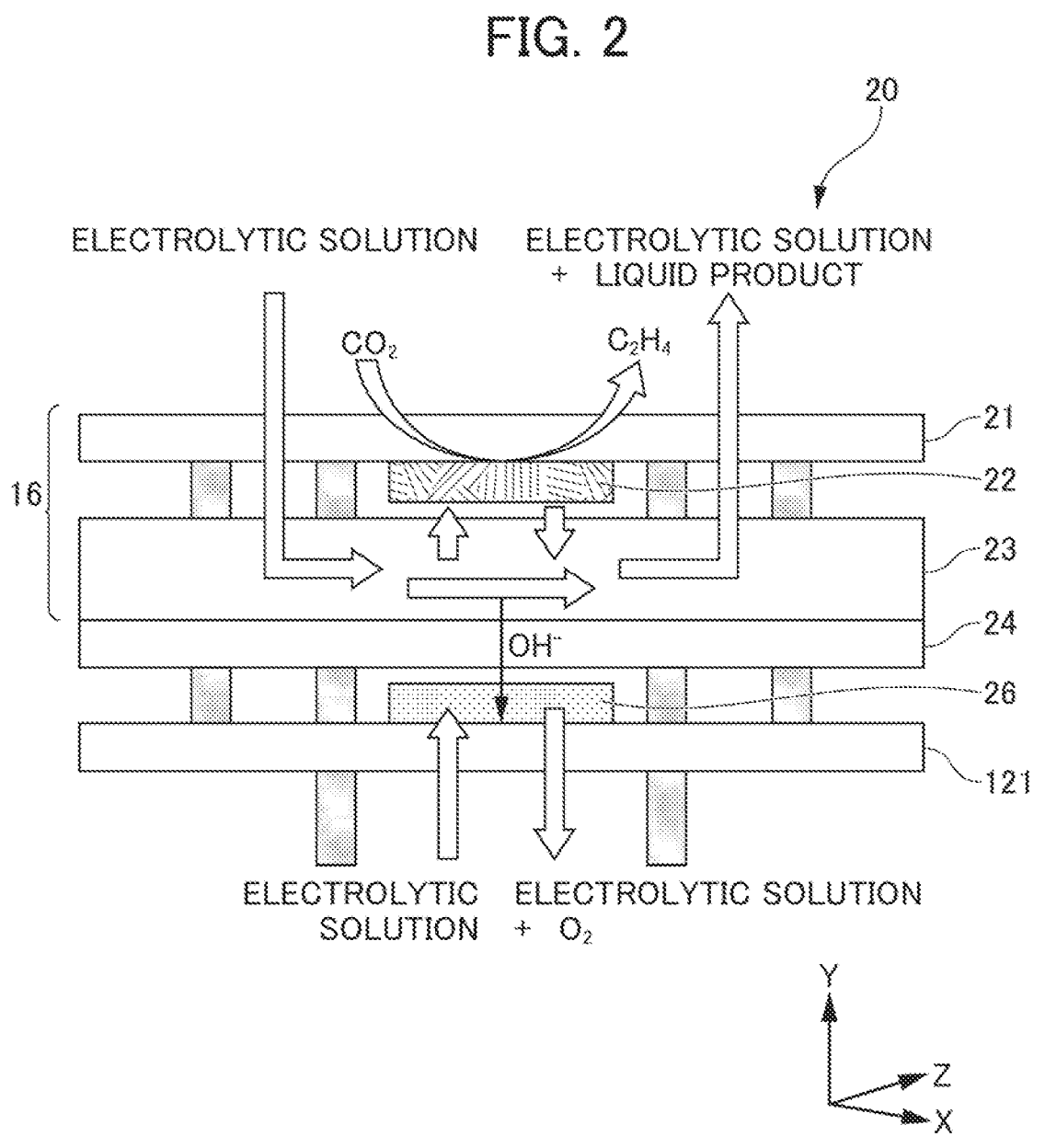

Next, a configuration example of the electrochemical reaction device 3 will be described. In this example, carbon dioxide supplied to the electrochemical reaction device 3 is a gas. FIG. 2 is a cross-sectional view schematically showing a configuration of the electrolytic cell 20 of the electrochemical reaction device 3 of the present embodiment.

As shown in FIG. 2, the electrolytic cell 20 includes a cathode-side supply structure 16, the cathode 22, an anion exchange membrane 24, an anode 26, and an anode-side flow path structure 121. The electrolytic cell 20 decomposes carbon dioxide. The cathode-side supply structure 16 is composed of a cathode-side primary flow path structure 21 and a cathode-side secondary flow path structure 23.

Figure 3:
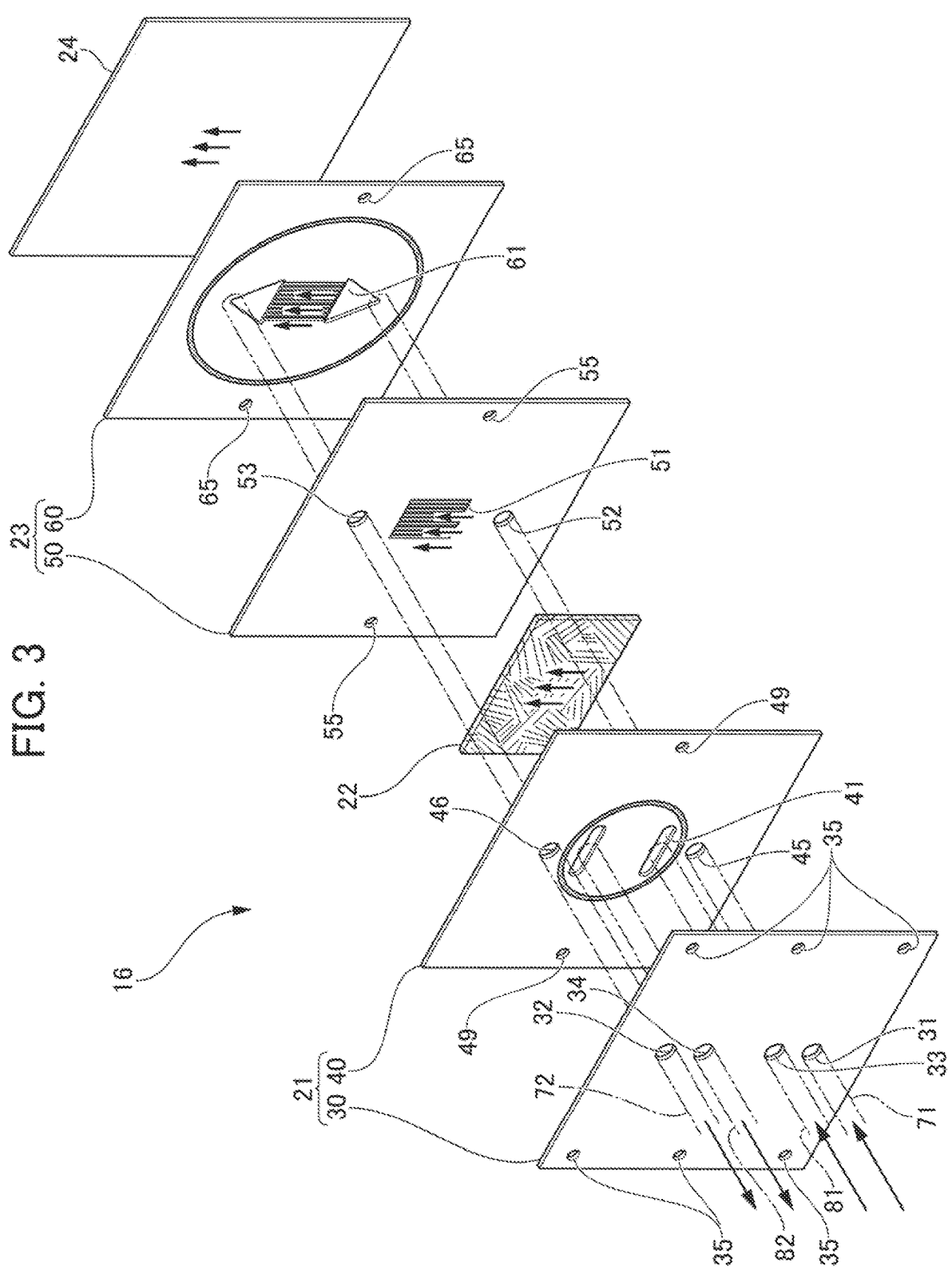
FIG. 3 is an exploded perspective view schematically showing a cathode-side configuration of the electrolytic cell of the present embodiment.

Referring to FIG. 3, the cathode 22 side configuration of the electrolytic cell 20 will be described. FIG. 3 is an exploded perspective view showing the cathode 22 side configuration of the electrolytic cell 20 of the present embodiment. Among the components of the electrolytic cell 20, FIG. 3 shows the cathode-side primary flow path structure 21, the cathode 22, the cathode-side secondary flow path structure 23, and the anion exchange membrane 24.

FIG. 3 also shows a tube 71 and a tube 72 with single-dotted lines. Through the tube 71, the electrolytic solution is supplied to the inside of the electrolytic cell 20. Through the tube 72, the electrolytic solution, supplied by the tube 71 to the electrolytic cell 20 and subjected to the reaction therein, is discharged to the outside. The electrolytic solution is, for example, a KOH electrolytic solution. This figure further shows a tube 81 and a tube 82 with double-dotted lines. The tube 81 serves as an inlet supply pipe through which carbon dioxide is supplied to the inside of the electrolytic cell 20. The tube 82 serves as an outlet supply pipe for discharging, to the outside, ethylene that is obtained by reducing the carbon dioxide supplied to the electrolytic cell 20 through the tube 81. The tube 71, tube 72, tube 81 and tube 82 are fluid supply pipes made of, for example, polytetrafluoroethylene (PTFE).

The cathode-side primary flow path structure 21 is made of metal, such as titanium. The cathode-side primary flow path structure 21 of the present embodiment includes a flow path cover unit 30 and a flow path main body 40. It is noted that between the flow path main body 40 and the flow path cover unit 30, for example, a gold-plated copper feeder (not shown) and an insulating sheet made of PTFE (not shown) are arranged in order from the flow path main body 40 side.

The flow path cover unit 30 is a plate-shaped component. The flow path cover unit 30 is provided with a through hole 31, a through hole 32, a through hole 33, and a through hole 34. Into the through hole 31, the tube 71 on the electrolytic solution inflow side is inserted. Into the through hole 32, the tube 72 on the electrolytic solution outflow side is inserted. Into the through hole 33, the tube 81 on the carbon dioxide inflow side is inserted. Into the through hole 34, the tube 82 on the carbon dioxide outflow side is inserted. In the present embodiment, the through hole 31, through hole 33, through hole 34, and through hole 32 are arranged in this order from one side to the other in a predetermined direction. In addition, the flow path cover unit 30 is provided with a plurality of fastening holes 35 where fastening members such as bolts are fastened to fix each component of the electrolytic cell 20.

Figure 4:
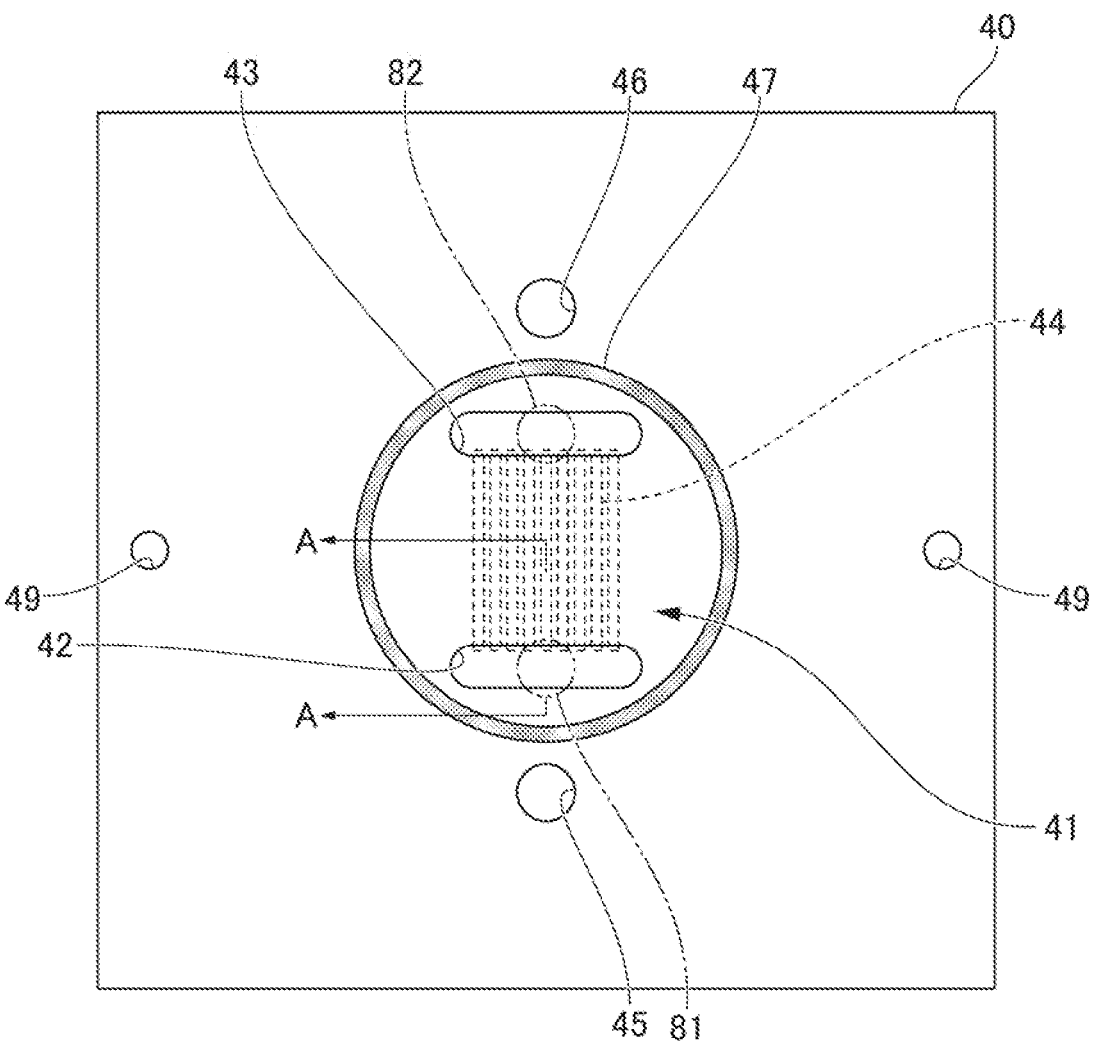
FIG. 4 is a front view showing a feeding side of a gas-phase flow path main body in the electrolytic cell of the present embodiment.
Figure 5:
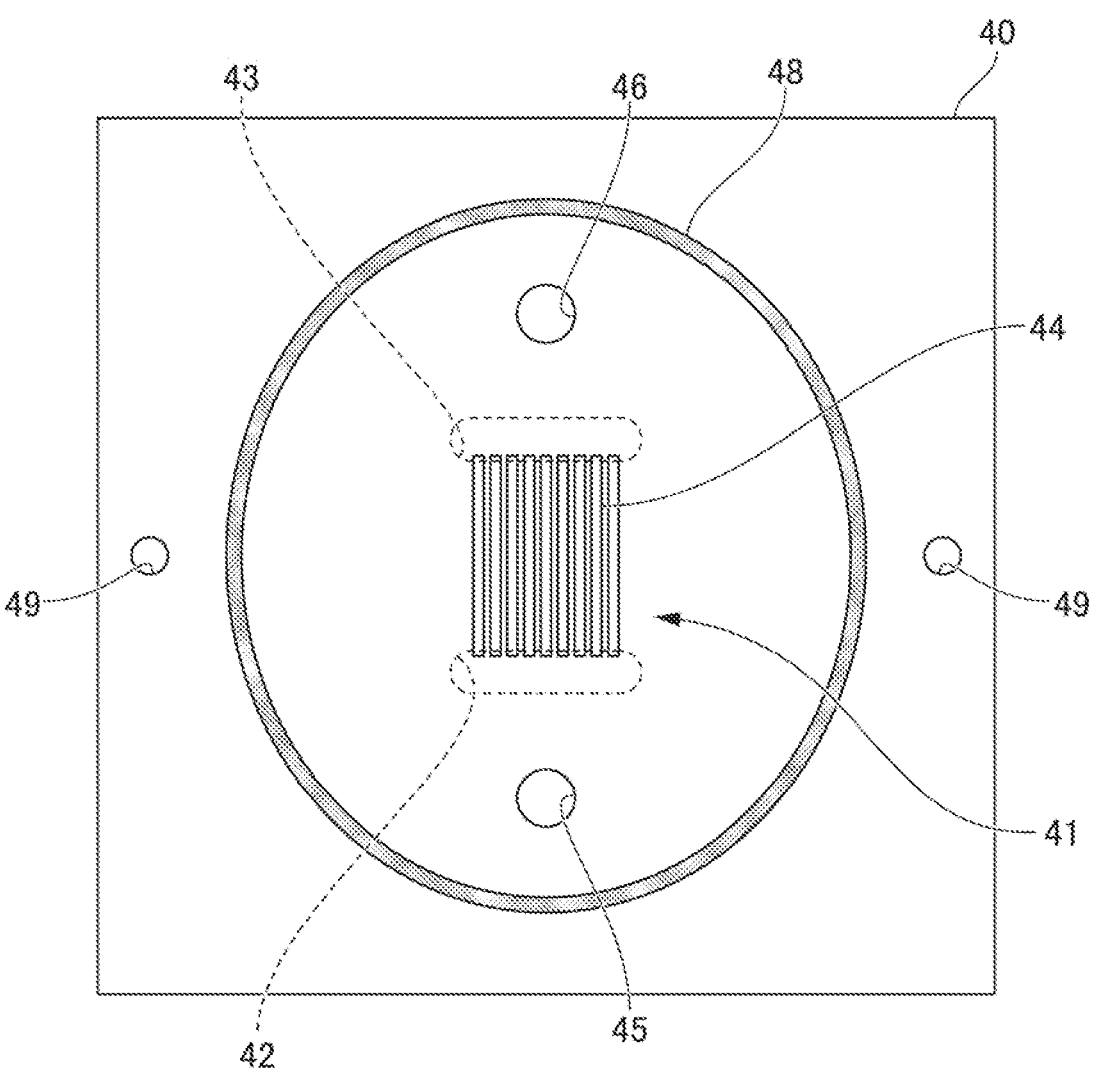
FIG. 5 is a rear view showing an electrode side of the gas-phase flow path main body in the electrolytic cell of the present embodiment.
Figure 6:
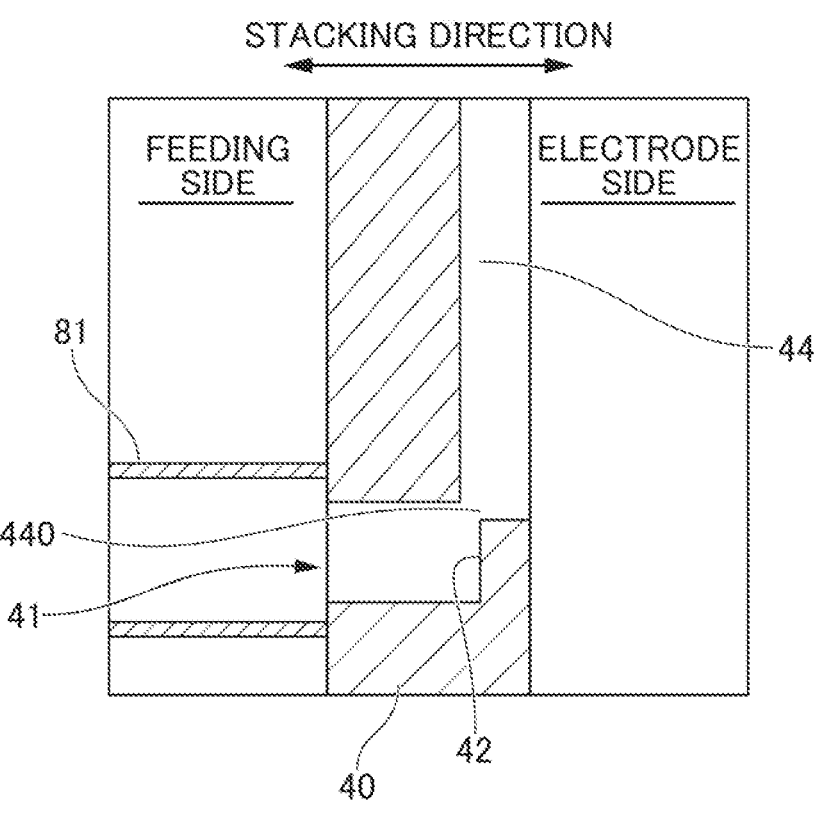
FIG. 6 is a cross-sectional view taken along line A-A in FIG. 4, showing a gas-phase flow path of the gas-phase flow path main body in the electrolytic cell of the present embodiment.
Figure 7:
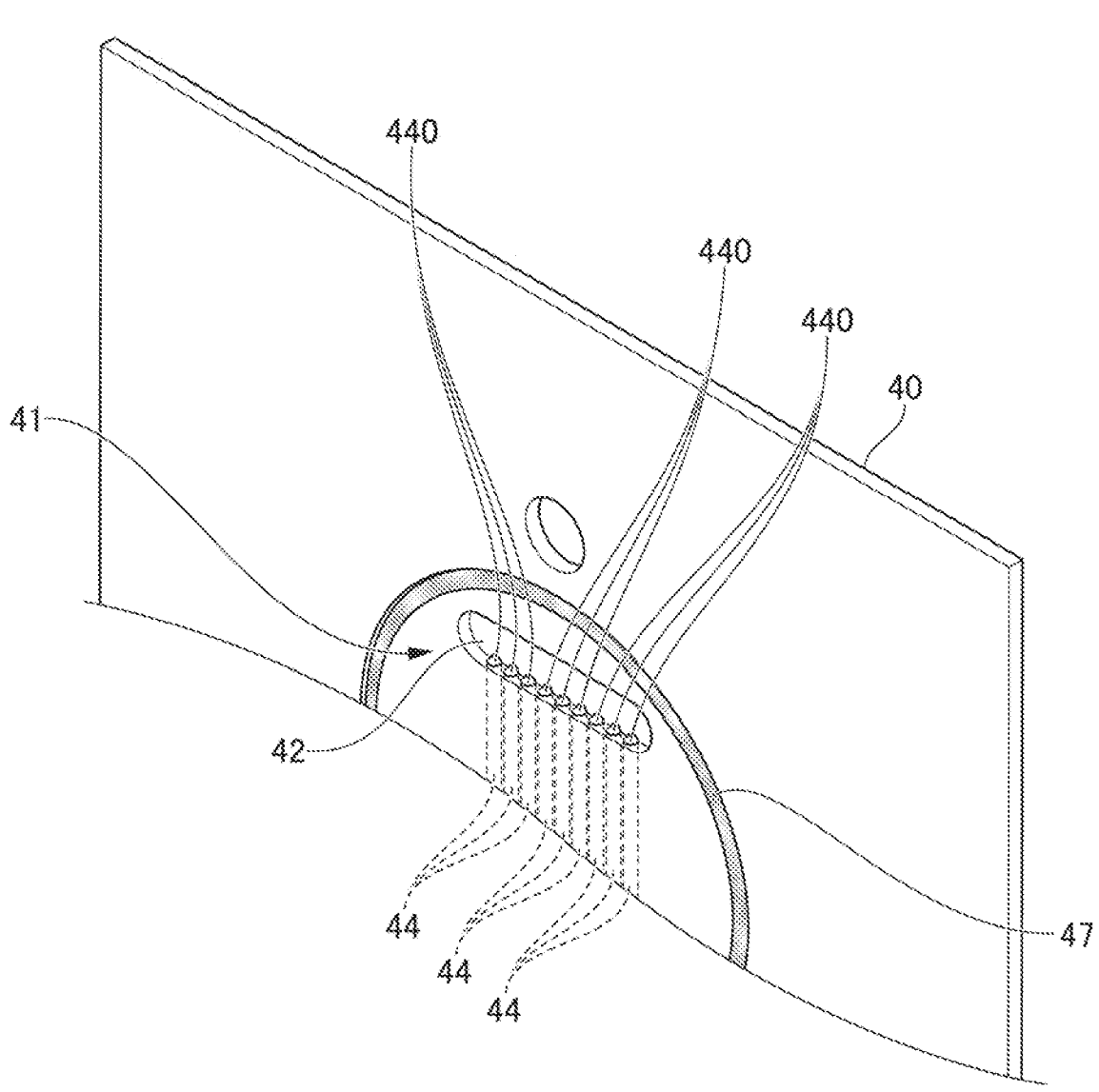
FIG. 7 is an enlarged perspective view showing, from a feeding side, an introduction unit of the gas-phase flow path of the gas-phase flow path main body in the electrolytic cell of the present embodiment.

The flow path main body 40 is a plate-shaped component and is arranged between the flow path cover unit 30 and the cathode 22. The flow path main body 40 will be described with reference to FIGS. 4 to 7. FIG. 4 is a front view showing a feeding side of the flow path main body 40 of the electrolytic cell 20 of the present embodiment, and FIG. 5 is a rear view showing its electrode side. FIG. 6 is a cross-sectional view taken along line A-A in FIG. 4, showing a fluid flow path 41 of the flow path main body 40 in the electrolytic cell 20 of the present embodiment. FIG. 7 is an enlarged perspective view showing, as the feeding side, an introduction unit 42 of the fluid flow path 41 of the flow path main body 40 in the electrolytic cell 20 of the present embodiment. In FIG. 7, the electrolytic cell 20 is shown upside down for convenience.

As shown in FIGS. 4 and 5, the flow path main body 40 has the fluid flow path 41, a seal unit 47, a seal unit 48, a through hole 45, a through hole 46, and guide holes 49. In the fluid flow path 41, the tube 81 on the carbon dioxide inflow side and the tube 82 on the carbon dioxide outflow side are connected together. The seal unit 47 is configured by embedding an O ring or the like in a groove so as to enclose the feeding side of the fluid flow path 41. The seal unit 48 is configured by embedding an O ring or the like in a groove so as to enclose the electrode side of the fluid flow path 41. Through the through hole 45, the tube 71 on the electrolytic solution inflow side passes. Through the through hole 46, the tube 72 on the electrolytic solution outflow side passes. Into the guide holes 49, guide rods are inserted when assembling the electrolytic cells 20.

The fluid flow path 41 includes: the introduction unit 42 and an outflow unit 43 that are formed in an oblong shape as viewed in the stacking direction on the feeding (flow path cover unit 30) side of the flow path main body 40; and contact units 44 each formed in an elongated groove shape on the electrode (cathode 22) side of the flow path main body 40. Each of the introduction unit 42 and the outflow unit 43 is a recess formed on the feeding-side surface of the flow path main body 40, and each of the contact units 44 is a recess formed on the electrode-side surface of the flow path main body 40.

The introduction unit 42 has its opening area formed wider than an opening area of the tube 81 and has an oblong shape that effectively suppresses the effects of pressure losses. The diameter of the tube 81 is set larger than the width of the introduction unit 42, so that the tube 81 abuts against the feeding-side surface of the flow path main body 40 so as to straddle the introduction unit 42. The outflow unit 43 has its opening area formed wider than an opening area of the tube 82 and has an oblong shape that effectively suppresses the effects of pressure losses. The diameter of the tube 82 is set larger than the width of the outflow unit 43, so that the tube 82 abuts against the feeding-side surface of the flow path main body 40 so as to straddle the outflow unit 43. Each of the introduction unit 42 and the outflow unit 43 has no corner and is formed in an oblong shape, thereby achieving the smooth flow of fluid.

In the present embodiment, the plurality of contact units 44 is formed. The upstream side end of each of the plurality of contact units 44 is connected to the introduction unit 42, while the downstream side end of each of the plurality of contact units 44 is connected to the outflow unit 43. By forming the plurality of contact units 44, the surface pressure thereof is not biased toward the end of the electrode, and thus uniform flow of electric current is achieved, as compared to a case where only a single contact unit 44 is formed.

As shown in FIGS. 6 and 7, a connection unit 440 between the introduction unit 42 and the contact unit 44 is located on the upstream side end of the contact unit 44, and it is formed at an area where the introduction unit 42 and part of the contact unit 44 overlap each other in the stacking direction. The connection unit 440 is formed to straddle the inner bottom corner of the introduction unit 42. It is noted that a connection area between the outflow unit 43 and the contact unit 44 is also configured in the same manner as the connection unit 440 between the introduction unit 42 and the contact unit 44.

The connection unit 440 between the introduction unit 42 and the contact unit 44 is realized, for example, by superimposing a position of a recess formed by cutting the introduction unit 42 from the feeding side of the flow path main body 40 on a position of a recess formed by cutting the contact unit 44 from the electrode side of the flow path main body 40. Thus, the upstream side end as an inlet of each of the plurality of contact units 44 and the downstream side end as an outlet thereof can be formed in the same shape with high positional accuracy, making the flow of fluid through the contact units 44 more uniform.

Returning to FIG. 3, the cathode 22 will be described. The cathode 22 is arranged between the cathode-side primary flow path structure 21 and the cathode-side secondary flow path structure 23. The cathode 22 is an electrode that electrochemically reduces carbon dioxide to produce carbon compounds and reduces water to produce hydrogen. The cathode 22 is hydrophobic, allowing gas and liquid to be separated and discharged out of the cell. The cathode 22 is composed of, for example, a gas diffusion layer and a cathode catalyst layer.

The gas diffusion layer may be one that allows the produced carbon compound gases and hydrogen to pass therethrough. The gas diffusion layer of the cathode 22 is not particularly limited, and examples thereof include carbon paper and carbon cloth.

The cathode catalyst layer may be formed on the flow path main body 40 side of the gas diffusion layer as mentioned above, or it may be configured to have its part embedded in the gas diffusion layer. Furthermore, a porous layer that is finer than the gas diffusion layer may be arranged between the gas diffusion layer and the cathode catalyst layer. As the cathode catalyst forming the cathode catalyst layer, any known catalyst that promotes the reduction of carbon dioxide can be used. Specific examples of cathode catalysts include metals such as gold, silver, copper, platinum, palladium, nickel, cobalt, iron, manganese, titanium, cadmium, zinc, indium, gallium, lead, and tin, their alloys, their intermetallic compounds, metal complexes such as ruthenium complexes, and rhenium complexes. Among them, copper and silver are preferable, and copper is more preferable because the reduction of carbon dioxide is promoted. One or more cathode catalysts may be used alone or in combination. As the cathode catalyst, a supported catalyst in which metal particles are supported on a carbon material (carbon particles, carbon nanotubes, graphene, etc.) may be used. The manufacturing method of the cathode 22 is not particularly limited, and an example thereof includes a method of applying a liquid composition containing a cathode catalyst onto the surface of the gas diffusion layer on the flow path main body 40 side and drying it.

Next, the cathode-side secondary flow path structure 23 will be described. The cathode-side secondary flow path structure 23 includes a liquid-phase flow path cover unit 50 and a liquid-phase flow path main body 60. The liquid-phase flow path cover unit 50 and the liquid-phase flow path main body 60 are made of, for example, polytetrafluoroethylene (PTFE).

The liquid-phase flow path cover unit 50 is formed in a plate shape. The liquid-phase flow path cover unit 50 is provided with a communication unit 51, a through hole 52, a through hole 53, and guide holes 55. The communication unit 51 communicates the cathode 22 side to the liquid-phase flow path main body 60 side. Into the through hole 52, the tube 71 on the electrolytic solution inflow side is inserted. Into the through hole 53, the tube 72 on the electrolytic solution outflow side is inserted. Into the guide holes 55, guide rods are inserted when assembling the electrolytic cells 20. The communication unit 51 is formed in the liquid-phase flow path cover unit 50 in the shape of multiple slits. The communication unit 51 corresponds to the position of the cathode 22 in the stacking direction.

Figure 8:
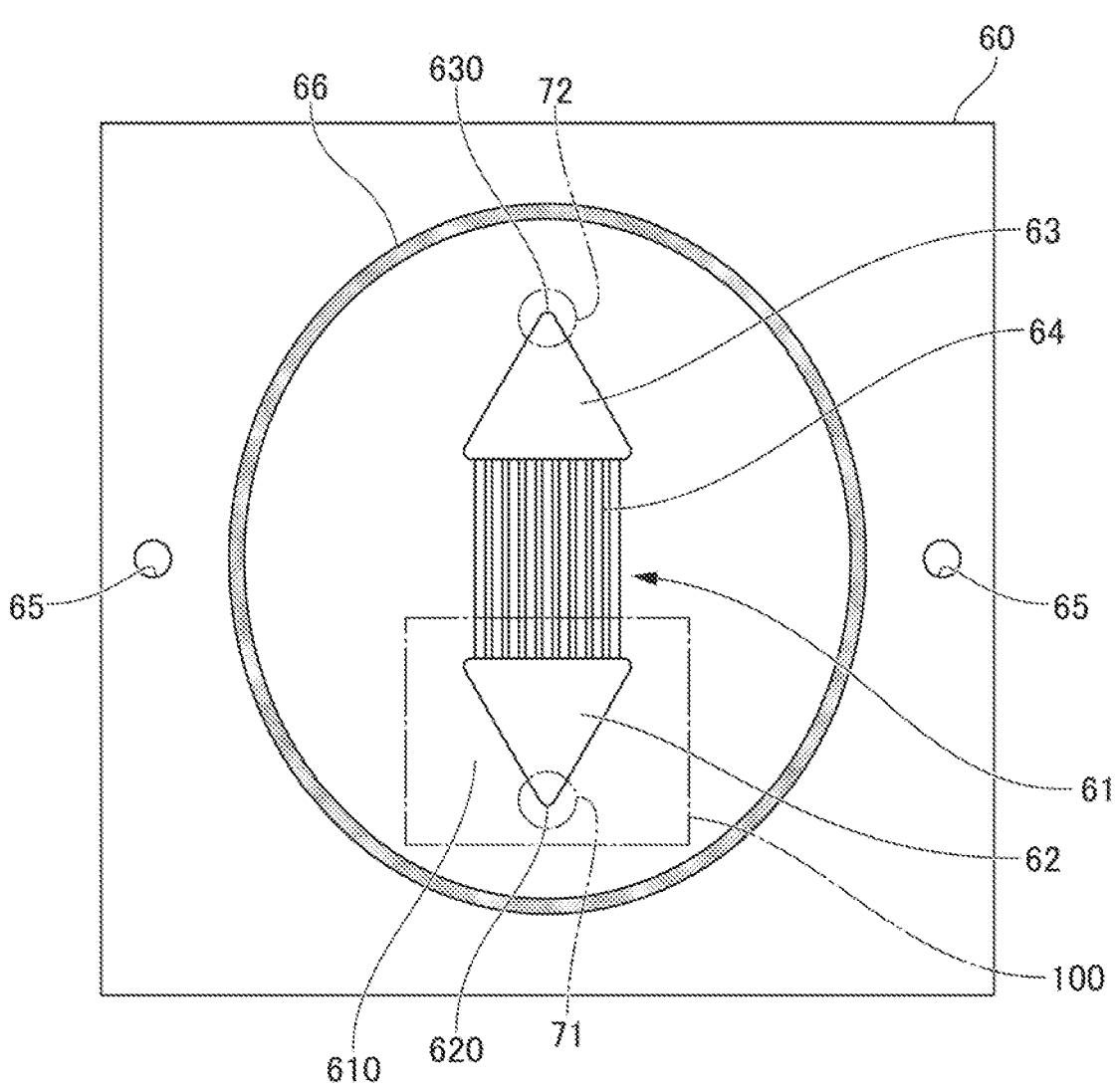
FIG. 8 is a front view showing the feeding side of a liquid-phase flow path main body in the electrolytic cell of the present embodiment.
Figure 9:
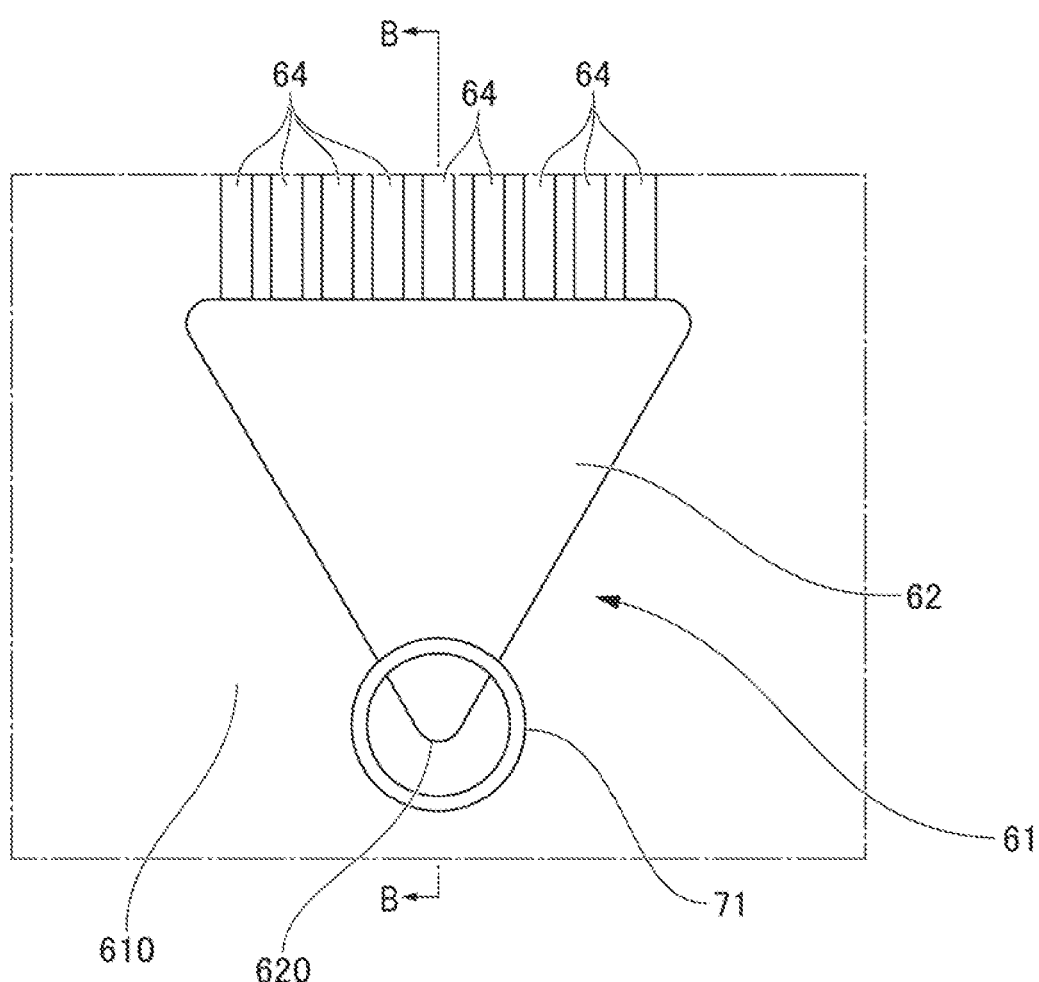
FIG. 9 is an enlarged front view showing a supply unit of the liquid-phase flow path of the liquid-phase flow path main body in the electrolytic cell of the present embodiment.
Figure 10:
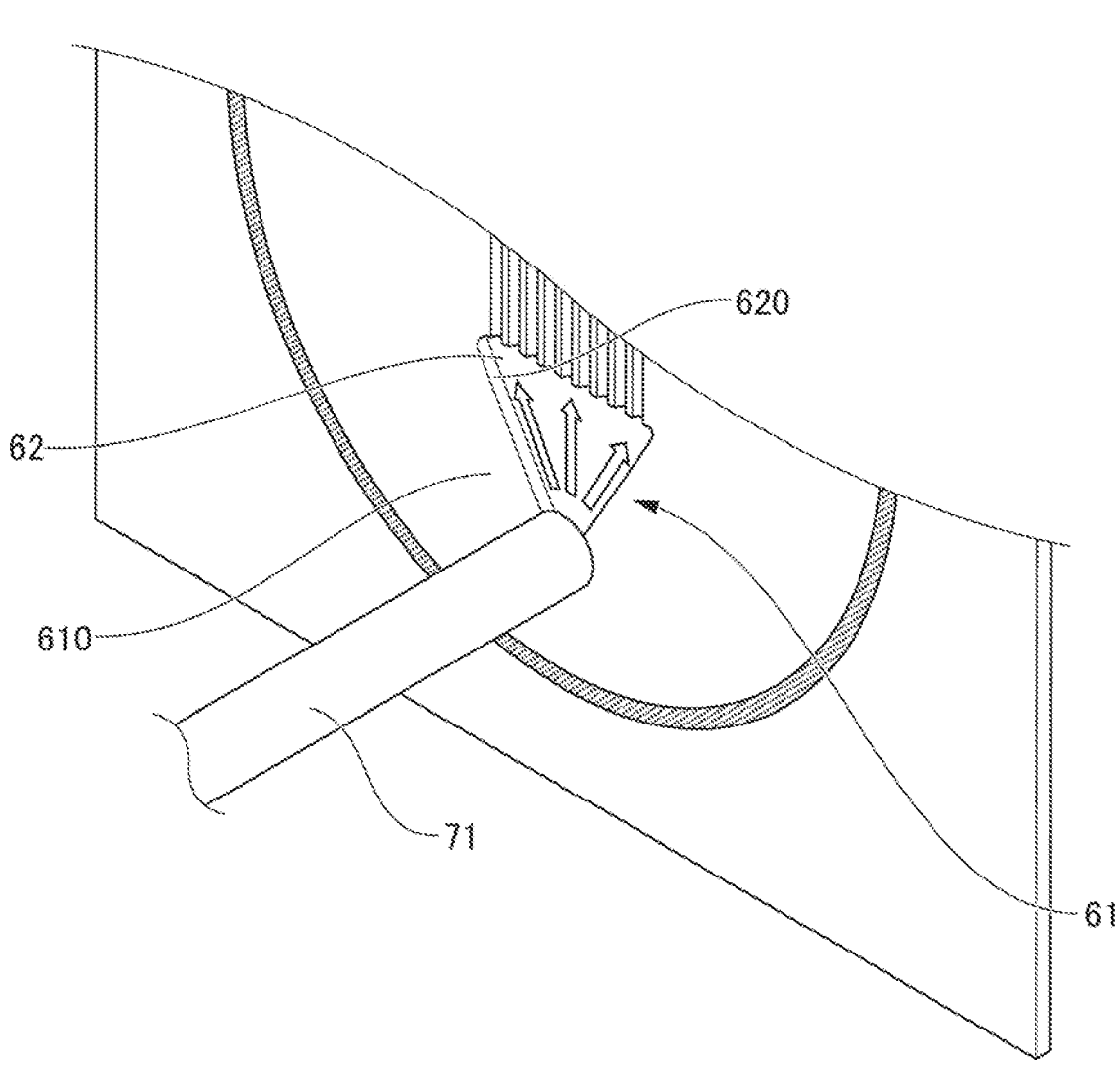
FIG. 10 is an enlarged perspective view showing the supply unit of the liquid-phase flow path of the liquid-phase flow path main body in the electrolytic cell of the present embodiment.
Figure 11:
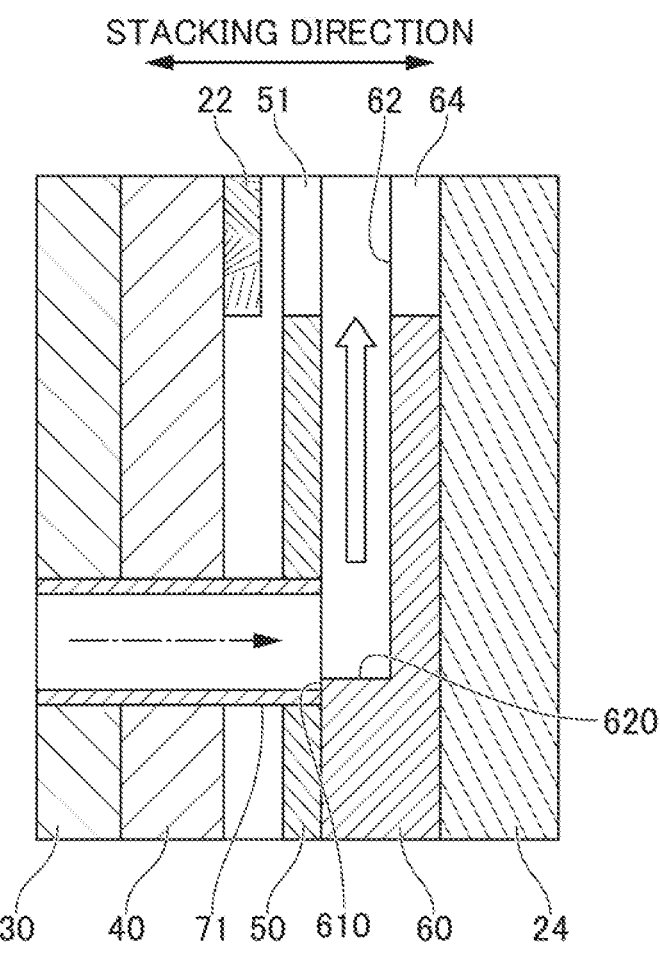
FIG. 11 is a cross-sectional view taken along line B-B in FIG. 9, showing the surroundings of the liquid-phase flow path of the liquid-phase flow path main body in the electrolytic cell of the present embodiment.

The liquid-phase flow path main body 60 is formed in a plate shape. The liquid-phase flow path main body 60 is arranged between the liquid-phase flow path cover unit 50 and the anion exchange membrane 24. The liquid-phase flow path main body 60 will be described with reference to FIGS. 8 to 11. FIG. 8 is a front view showing a feeding side of the liquid-phase flow path main body 60 in the electrolytic cell 20 of the present embodiment. FIG. 9 is an enlarged front view showing a supply unit 62 of a liquid-phase flow path 61 of the liquid-phase flow path main body 60 in the electrolytic cell 20 of the present embodiment. FIG. 10 is an enlarged perspective view showing the supply unit 62 of the liquid-phase flow path 61 of the liquid-phase flow path main body 60 in the electrolytic cell 20 of the present embodiment. FIG. 11 is a cross-sectional view taken along line B-B in FIG. 9, showing the surroundings of the liquid-phase flow path 61 of the liquid-phase flow path main body 60 in the electrolytic cell 20 of the present embodiment.

As shown in FIG. 8, the liquid-phase flow path main body 60 has the liquid-phase flow path 61 that is connected to the tube 71 on the electrolytic solution inflow side and the tube 72 on the electrolytic solution outflow side; a seal unit 66 configured by embedding an O ring or the like in a groove so as to enclose the feeding side of the liquid-phase flow path 61; and the guide holes 65 into which guide rods are inserted when assembling the electrolytic cells 20.

The liquid-phase flow path 61 includes the supply unit 62 connected to the tube 71 on the electrolytic solution inflow side, a discharge unit 63 connected to the tube 72 on the electrolytic solution outflow side, and connection units 64 each connecting the supply unit 62 and the discharge unit 63. Each of the supply unit 62 and the discharge unit 63 is a recess formed on the feeding-side surface of the liquid-phase flow path main body 60, and each of the connection units 64 is formed in the shape of an elongated slit so as to communicate the liquid-phase flow path cover unit 50 side to the anion exchange membrane 24 side.

Each of the supply unit 62 and the discharge unit 63 is a recess formed in a substantially triangular shape as viewed in the stacking direction. The supply unit 62 is set to have a size large enough to be wider than the opening area of the tube 71 so that its opening area can reduce pressure losses. The supply unit 62 and the discharge unit 63 are arranged to face the feeding side of the liquid-phase flow path main body 60 such that a part of the supply unit 62 corresponding to one side of its triangle shape is parallel to a part of the discharge unit 63 corresponding to one side of its triangle shape across the connection unit 64. Both the supply unit 62 and the discharge unit 63 are formed to have their tips rounded. This shape allows the electrolytic solution to flow smoothly.

In the present embodiment, a plurality of connection units 64 is formed. The upstream side end of each of the plurality of connection units 64 is connected to the supply unit 62, while the downstream side end of each of the plurality of connection units 64 is connected to the discharge unit 63. The connection unit 64 of the liquid-phase flow path main body 60 and the communication unit 51 of the liquid-phase flow path cover unit 50 are configured such that their positions coincide with each other in the stacking direction. Therefore, the cathode 22 side and the anion exchange membrane 24 side communicate with each other across the communication unit 51 of the liquid-phase flow path cover unit 50 and the connection unit 64 of the liquid-phase flow path main body 60. Furthermore, the position of the contact unit 44 of the flow path main body 40 also corresponds to each of the positions of the communication unit 51 of the liquid-phase flow path cover unit 50 and the connection unit 64 of the liquid-phase flow path main body 60.

The tube 71 on the electrolytic solution inflow side is connected to a tip 620 facing the side connected to the upstream ends of the connection units 64 in the supply unit 62. The tube 72 on the electrolyte outflow side is connected to a tip 630 facing the side connected to the downstream ends of the connection units 64 in the discharge unit 63.

As shown in FIGS. 9 to 11, the tube 71 is connected to the tip 620 of the supply unit 62 such that a part of the tube 71 is superimposed on the tip 620 as viewed in the stacking direction. A tip surface of the tube 71 is in the state of abutting against the surroundings of the tip 620 at an electrode-side surface 610 of the liquid-phase flow path main body 60. Thus, the whole tip surface of the tube 71 is not located inside the supply unit 62 as viewed in the stacking direction, but a part of the tip surface of the tube 71 is located inside the supply unit 62 and the other part thereof is superimposed on the surface 610 of the liquid-phase flow path main body 60 outside the supply unit 62. It is noted that the tip surface of the tube 72 connected to the discharge unit 63 is also connected so as to abut against the surface 610 around the tip 630 of the discharge unit 63 in the same manner as the tube 71. Thus, the connection positions of the tubes 71 and 72 in the stacking direction are fixed, which achieves high-accuracy positioning.

Returning to FIG. 2, the anode 26 and the anode-side flow path structure 121 will be described. The anode 26 is arranged between the anode-side flow path structure 121 and the anion exchange membrane 24. In the descriptions below, the common or same configuration as the cathode 22 side configuration may be denoted by the same reference character, and its detailed description may be omitted.

The anode 26 is an electrode that oxidizes hydroxide ions to produce oxygen. The anode 26 is composed of, for example, a gas diffusion layer and an anode catalyst layer.

The gas diffusion layer may be one that allows the produced oxygen to pass therethrough. The gas diffusion layer of the anode 26 is not particularly limited, and examples thereof include carbon paper and carbon cloth. In addition, as the gas diffusion layer, a porous product such as a mesh material, a punching material, a porous component, and a metal fiber sintered product may be used. Examples of materials of porous products include metals such as titanium, nickel, and iron, and alloys thereof (for example, SUS).

The anode catalyst layer is not particularly limited, and a known anode catalyst can be used. Specific examples thereof include metals such as platinum, palladium, and nickel, alloys thereof, intermetallic compounds thereof, metal oxides such as manganese oxide, iridium oxide, nickel oxide, cobalt oxide, iron oxide, tin oxide, indium oxide, ruthenium oxide, lithium oxide, and lanthanum oxide, and metal complexes such as a ruthenium complex and a rhenium complex. One of these anode catalysts may be used alone or two or more thereof may be used in combination.

The anode-side flow path structure 121 has a structure common to the cathode-side primary flow path structure 21 on the cathode 22 side. The anode-side flow path structure

121 includes the flow path cover unit 30 shown in FIG. 3 and the flow path main body 40 shown in FIGS. 3 to 7. The tube on the electrolytic solution inflow side is inserted into the through hole 33 of the flow path cover unit 30 of the anode-side flow path structure 121, while the tube on the electrolytic solution outflow side is inserted into the through hole 34. In the flow path cover unit 30 of the anode-side flow path structure 121, the through holes that correspond to the through hole 31 and the through hole 32 formed in the flow path cover unit 30 of the cathode-side primary flow path structure 21 are closed.

The flow path main body 40 of the anode-side flow path structure 121 is arranged between the flow path cover unit 30 and the anode 26 and has a structure common to the flow path main body 40 of the cathode-side primary flow path structure 21 on the cathode 22 side. An electrolytic solution is supplied to the fluid flow path 41 in the flow path main body 40 of the anode-side flow path structure 121. The electrolytic solution is supplied to the introduction unit 42 of the fluid flow path 41, and then the electrolytic solution, which contains oxygen produced from the reaction while passing through the contact units 44 from the introduction unit 42, is discharged from the outflow unit 43 to the exterior along with oxygen.

The configuration of the electrolytic cell 20 of the present embodiment has been described above. In the electrolytic cell 20 of the present embodiment, voltage is applied between the cathode 22 and the anode 26, whereby the cathode 22 electrochemically reduces carbon dioxide to produce carbon compounds and also reduces water to produce hydrogen. Examples of carbon compounds produced by reducing carbon dioxide in the cathode 22 include carbon monoxide, ethylene, ethanol, etc. For example, carbon monoxide and ethylene are produced as gaseous products in the following reactions. Hydrogen is also produced in the cathode 22 in the following reaction. The gaseous carbon compound and hydrogen produced pass through the gas diffusion layer of the cathode 22 and flow out of the tube 82.

$$CO_2 + H_2O \rightarrow CO + 2OH^-$$

$$2CO + 8H_2O \rightarrow C_2H_4 + 8OH^- + 2H_2O$$

$$2H_2O \rightarrow H_2 + 2OH^-$$

Hydroxide ions produced at the cathode 22 are transferred to the anode 26, followed by being oxidized in the following reaction to produce oxygen. On the anode 26 side, the produced oxygen and electrolytic solution are discharged out of the cell in a mixed state.

$$4OH^- \rightarrow O_2 + 2H_2O$$

In this way, the electrolytic cell 20 having the cathode 22 and the anode 26 of the present embodiment includes: the plate-shaped cathode-side primary flow path structure 21 having the fluid flow path 41 in which the fluid comes into contact with the cathode 22; the tube 81 connected to the upstream side of the fluid flow path 41 and configured to supply the fluid; and the tube 82 connected to the downstream side of the fluid flow path 41 and configured to supply the fluid. In addition, the electrolytic cell 20 includes: the plate-shaped anode-side flow path structure 121 having the fluid flow path 41 in which the fluid comes into contact with the anode 26; the tube 81 connected to the upstream side of the fluid flow path 41 and configured to supply the fluid; and the tube 82 connected to the downstream side of the fluid flow path 41 and configured to supply the fluid. The fluid flow path 41 has the introduction unit 42, the outflow unit 43, and the contact units 44. The introduction unit 42 is formed on the surface of the cathode-side primary flow path structure 21 opposite to the electrode (cathode 22 or anode 26) as an elongated recess with a width smaller than that of the tube 81. The tube 81 abuts against the introduction unit 42 so as to straddle the introduction unit 42. The outflow unit 43 is formed on the surface of the cathode-side primary flow path structure 21 opposite to the electrode (cathode 22 or anode 26) as an elongated recess with a width smaller than that of the tube 82. The tube 82 abuts against the outflow unit 43 so as to straddle the outflow unit 43. The contact unit 44 is formed in a groove shape on the surface of the cathode-side primary flow path structure 21 on the electrode (cathode 22 or anode 26) side. The contact unit 44 has its upstream end connected to the introduction unit 42 and its downstream end connected to the outflow unit 43.

Thus, the tube 81 abuts against the introduction unit 42, while the tube 82 abuts against the outflow unit 43, whereby the connection positions of the tube 81 and the tube 82 are fixed, making it possible to stably supply and discharge the fluid. Furthermore, after the fluid supplied from the tube 81 is diffused in the introduction unit 42, the fluid can uniformly flow to the plurality of contact units 44. Meanwhile, the fluid is dispersed in the outflow unit 43 and thus can return through the tube 82. In other words, uniform distribution and smooth merging of the fluid to the plurality of contact units 44 can be achieved.

In the present embodiment, the introduction unit 42 and the contact unit 44 communicate with each other such that the upstream end of the contact unit 44 is superimposed on the downstream end of the introduction unit 42 in the thickness direction of the cathode-side primary flow path structure 21 (or the anode-side flow path structure 121). In addition, the outflow unit 43 and the contact unit 44 communicate with each other such that the downstream end of the contact unit 44 is superimposed on the upstream end of the outflow unit 43 in the thickness direction of the cathode-side primary flow path structure 21 (or the anode-side flow path structure 121).

Thus, the inlet and outlet of the contact unit 44 can be set with high accuracy. For example, the inlet and outlet can be fabricated in the same shape with high accuracy by cutting the cathode-side primary flow path structure 21 (or anode-side flow path structure 121) from its one side while also cutting it from the opposite side.

In the present embodiment, a connection area between the introduction unit 42 and the contact unit 44 is formed to straddle the side surface and the bottom surface of the recess in the introduction unit 42, while a connection area between the outflow unit 43 and the contact unit 44 is formed to straddle the side surface and the bottom surface of the recess in the outflow unit 43.

Thus, since the connection areas are formed at the positions where the fluid is easily collected, the inflow of the fluid from the introduction unit 42 into the contact unit 44 and the outflow of the fluid from the contact unit 44 to the outflow unit 43 can be performed smoothly.

In the present embodiment, both the introduction unit 42 and the outflow unit 43 are formed in an oblong shape.

Thus, the fluid from the introduction unit 42 can flow out of the outflow unit 43 through the contact units 44 without being stuck at the corners.

Figure 12:
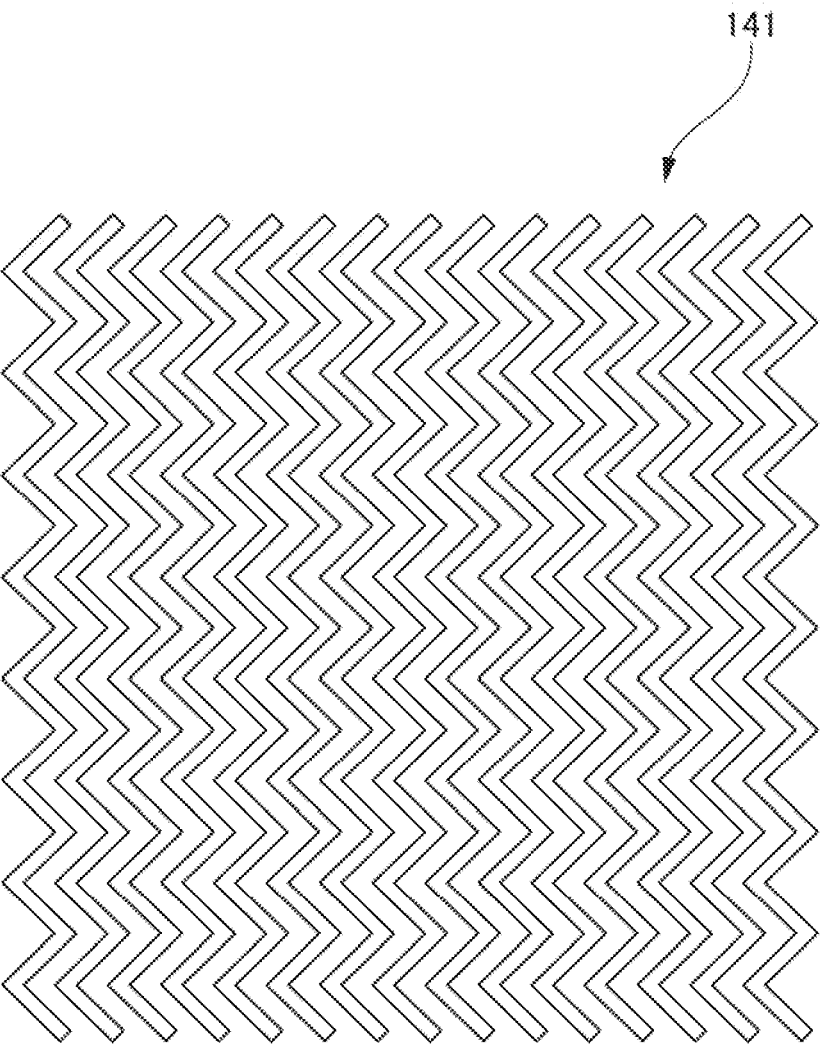
FIG. 12 is a schematic diagram showing the shape of a contact unit, a communication unit, and a connection unit of a modification.

An example has been described in which the contact unit 44 is configured in the form of a linear groove and the communication unit 51 and the connection unit 64 are configured in the form of a linear slit. However, the shape of each of the contact unit 44, communication unit 51, and connection unit 64 is not limited to the configuration of the above embodiment. As shown in FIG. 12, a flow path 141 can be formed into a zigzag shape instead of a linear shape, or it can be formed in a wavy shape.

In addition, the components in the above embodiments can be replaced with well-known components appropriately without straying from the purposes of the present invention, and the aforementioned variations may be combined as appropriate. For instance, in the above embodiment, the configuration in which carbon dioxide is supplied to the electrochemical reaction device as a gas has been described by way of example, but the electrolytic cell of the present embodiment can also be applied to a configuration in which carbon dioxide is dissolved in an electrolytic solution and the electrolytic solution containing carbonate ions is supplied to the electrochemical reaction device.

3 Electrochemical reaction device
16 Cathode-side supply structure
20 Electrolytic cell
21 Cathode-side primary flow path structure
22 Cathode
23 Cathode-side secondary flow path structure
24 Anion exchange membrane
26 Anode
41 Fluid flow path
42 Introduction unit
43 Outflow unit
44 Contact unit
61 Liquid-phase flow path
62 Supply unit
63 Discharge unit
64 Contact unit
121 Anode-side flow path structure

What is claimed is:

1. An electrolytic cell having a cathode and an anode that are electrodes, and configured to decompose carbon dioxide, the electrolytic cell comprising:

a cathode-side primary flow path structure including a fluid flow path to which carbon dioxide as a fluid to be decomposed is supplied through a carbon dioxide supply pipe, the fluid flow path communicating with the cathode and being configured to supply the carbon dioxide to the cathode;

a cathode-side secondary flow path structure sandwiching the cathode between the cathode-side secondary flow path structure and the cathode-side primary flow path structure and interposed between the cathode and an anion exchange membrane, the cathode-side secondary flow path structure including an electrolytic solution flow path to which an electrolytic solution is supplied through an electrolytic solution supply pipe, the electrolytic solution flow path establishing communication between a side closer to the cathode and a side closer to the anion exchange membrane and being configured to supply the electrolytic solution to the cathode; and an anode-side flow path structure including a fluid flow path that supplies an electrolytic solution as a fluid to the anode, wherein one or both of the cathode-side primary flow path structure and the anode-side flow path structure is/are connected to an inflow side supply pipe connected to an upstream side of the fluid flow path and configured to supply the fluid; and an outflow side supply pipe connected to a downstream side of the fluid flow path and configured to supply the fluid, and one or both of the fluid flow path of the cathode-side primary flow path structure and the fluid flow path of the anode-side flow path structure includes/include:

an introduction unit provided on a surface of the flow path structure opposite to the electrode as an elongated recess with a width smaller than that of the inflow side supply pipe, the inflow side supply pipe abutting against the introduction unit so as to straddle the introduction unit;

an outflow unit provided on a surface of the flow path structure opposite to the electrode as an elongated recess with a width smaller than that of the outflow side supply pipe, the outflow side supply pipe abutting against the outflow unit so as to straddle the outflow unit; and a plurality of connection units each provided in a groove shape on a surface of the flow path structure on the electrode side, each of the connection units having an upstream end thereof connected to the introduction unit and a downstream end thereof connected to the outflow unit.

2. The electrolytic cell according to claim 1, wherein the introduction unit and the connection unit communicate with each other such that the upstream end of the connection unit is superimposed on a downstream end of the introduction unit in a thickness direction of the flow path structure, and the outflow unit and the connection unit communicate with each other such that the downstream end of the connection unit is superimposed on an upstream end of the outflow unit in the thickness direction of the flow path structure.

3. The electrolytic cell according to claim 2, wherein a connection area between the introduction unit and the connection unit straddles a side surface and a bottom surface of the recess in the introduction unit, and a connection area between the outflow unit and the connection unit straddles a side surface and a bottom surface of the recess in the outflow unit.

4. The electrolytic cell according to claim 1, wherein both the introduction unit and the outflow unit have an oblong shape.

5. The electrolytic cell according to claim 2, wherein both the introduction unit and the outflow unit have an oblong shape.

6. The electrolytic cell according to claim 3, wherein both the introduction unit and the outflow unit have an oblong shape.

* * * * *